United States Patent [19]

Kruesi

[11] Patent Number: 4,494,436
[45] Date of Patent: Jan. 22, 1985

[54] APPARATUS FOR MANUFACTURING RESIN IMPREGNATED FIBER BRAIDED PRODUCTS

[75] Inventor: August H. Kruesi, Wallingford, Vt.

[73] Assignee: Elfin Corporation, Wallingford, Vt.

[21] Appl. No.: 528,929

[22] Filed: Sep. 2, 1983

[51] Int. Cl.³ .............................................. D04C 3/40
[52] U.S. Cl. ........................................ 87/23; 87/34; 156/148
[58] Field of Search ............................ 87/1, 23, 34, 33; 156/148, 433

[56] References Cited

U.S. PATENT DOCUMENTS

| | | | |
|---|---|---|---|
| 1,098,257 | 5/1914 | Healey et al. | 87/23 |
| 1,110,671 | 9/1914 | Cobb | 87/23 X |
| 3,653,295 | 4/1972 | Pintard | 87/23 X |

*Primary Examiner*—John Petrakes
*Attorney, Agent, or Firm*—Sughrue, Mion, Zinn, Macpeak & Seas

[57] ABSTRACT

A braid wrapping wheel or carrier is mounted for rotation about its axis and concentrically surrounds a mandrel. The carrier bears rotatable spools of filaments or fiber material about its periphery. One end of each filament is affixed to the mandrel at a point axially displaced from the plane of carrier rotation and the filaments braid about the mandrel during carrier rotation and axial shifting of the mandrel along its axis. A guide ring contacting the filaments intermediate of the spools and the filament contact area on the mandrel define a path of movement for the inclined filaments. A fixedly mounted angular guide ring concentric about the mandrel partially defines a closed plenum chamber bearing a liquid resin under pressure. The resin is fed through fine pores within the ring wall over which the filaments are trained to resin impregnate the filaments. By control of the pressure of the liquid a bead of liquid is maintained at each pore for wiping by the filament during passage with the pressure being insufficient to cause the resin to bleed from the plenum chamber via the pores during filament stoppage or absent the presence of filaments trained about the guide ring. One or more soft rubber scrapers wipe excess resin off the filaments and press the filaments against the mandrel. Alternatively, a number of atomizing nozzles spaced around the guide ring may apply the resin by production of a wet "fog" whose resin droplets quickly wet out the fibers without impinging on the fibers at high velocity.

9 Claims, 4 Drawing Figures

APPARATUS FOR MANUFACTURING RESIN IMPREGNATED FIBER BRAIDED PRODUCTS

BACKGROUND OF THE INVENTION

This invention relates to a braiding machine for the production of fiber reinforced plastics (FRP) and more particularly to a braiding machine in which a resin impregnation of the fibers is effected prior to a braiding of the resin impregnated fibers about a mandrel.

The increasingly wide spread use of FRP for industrial, recreational and aerospace applications has stimulated research into new methods for manufacturing FRP components. Braiding machines for braiding the fibers to effect the reinforcement offer several advantages when adapted to make FRP parts. Braiding equipment is generally much less expensive than winding or pultration equipment, braiding is inherently capable of forming tapered or irregular geometry parts and a braided structure provides a better balance of physical properties because of the innerweaving of the fibers functioning to provide the reinforcement to the plastic structure.

A major difficulty in adapting commercial braiding equipment to produce FRP components is the necessity to impregnate the fibers in a thorough and continuous manner without resin waste or contamination of the work area. Optimum strength is obtained only when the fibers are fully resin impregnated with no significant voids or air bubbles. Conversely, large pockets of resin (resin-rich) must be avoided.

In the past, impregnation has been accomplished by using pre-impregnated fibers or by wrapping partially cured (B-stage) resin film around the braid after each layer is completed. However, these partially cured resin products are expensive, have limited shelf life even when stored in a freezer and applying the partially cured resin film is cumbersome and slow.

It is therefore a primary object of the present invention to provide an improved braiding machine for continuously impregnating fibers during braiding or weaving and to thereby produce high quality, low cost composite parts.

It is a further object of the present invention to provide an improved braiding machine of this type in which resin waste and contamination is minimized, impregnation is complete for each filament, the resin content of the finished product is uniform and wherein a braiding may be achieved bidirectionally by momentarily halting the operation and tying the braid in place.

SUMMARY OF THE INVENTION

The present invention is directed to a braiding machine for braiding a plurality of filaments about a mandrel. The machine includes a base, a mandrel supported on the base for movement along its axis and a braid wrapping carrier mounted about said support for rotation concentrically about the mandrel axis. Spools of filaments to braided are mounted to said carrier at spaced circumferential positions with the spools being rotatable about their axis to permit the filament to be removed therefrom. A free end of each filament is fixed to the mandrel at a point axially spaced from the plane of the carrier rotation and means are provided for rotation of the carrier to cause the filaments to braid about the mandrel during axial shifting of the mandrel. The improvement comprises an applicator ring effectively mounted concentrically about the mandrel between the carrier and the area of filament contact with the mandrel. Means internally of the ring and the portion of the applicator ring about which the filaments wrap during movement from the spools to the mandrel define a closed plenum chamber to which is supplied liquid resin under pressure. Finite pores within the filament wrapping surface of the applicator ring allow contact of the filaments and individual beads of resin at the pores such that the resin is removed by capillary action by the filament wiping across the pores. Means for controlling the pressure of the liquid resin within the plenum chamber insure a continuous flow of resin to the pores while preventing overpressurization and preventing excess resin from bleeding from the applicator ring pores during machine non-braiding.

The axis of the mandrel may be horizontal, the applicator ring may include a vertical wall bearing a small diameter perforations which define the pores through which the resin passes to reach the filaments. Dual applicator rings arranged and mounted back to back define a gap corresponding generally to the diameter of the filaments passing therethrough with the finite pores within opposed surface of the applicator ring feeding resin for insured resin impregnation of the filaments. The vertical walls may flare outwardly away from the gap through which the filaments pass and are impregnated to terminate on the side towards the filament contact area with the mandrel in drain pans and wherein, the flared walls bear at least one flexible scraper for pressing the filament against the mandrel causing excess resin to flow back to the drain pans for recirculation or for discard. Draining of the plenum chamber permits subsequent cleaning of the circulation loop of resin by applying compressed air thereto or by forcing solvents through the system including the pores.

A pair of back to back applicator rings of a circular tubular cross section may define therebetween a gap sized to the filament diameter. The application rings about which the filaments may partially wrap has a surface area above the horizontal center plane perforated to form the pores for permitting resin under pressure to be applied to the filaments for impregnation under very low surface tension at the pores.

In an alternate embodiment, both rings are imperforate and baffle structures to the outside of the rings bear atomizer nozzles for the creation of a wet fog of resin droplets which quickly and efficiently wet out the fibers without impinging on the fibers at high velocity thereby minimizing waste and a potential damage by impact.

A BRIEF DESCRIPTION OF THE FIGURES

DESCRIPTION OF THE PREFERRED EMBODIMENTS

Figure 1:
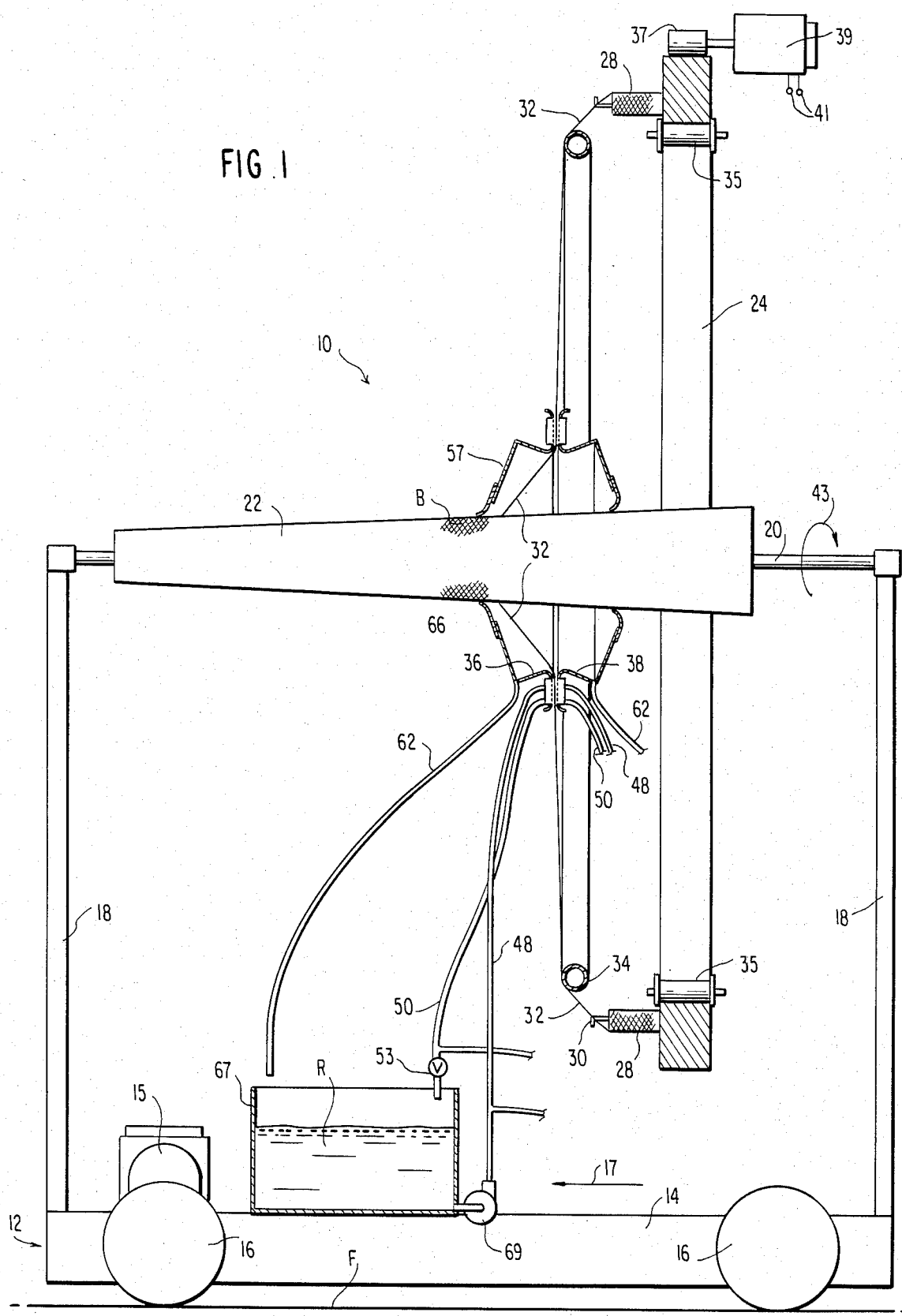
FIG. 1 is a vertical elevational view, partially in section of a braiding machine forming a preferred embodiment of the present invention.
Figure 2:
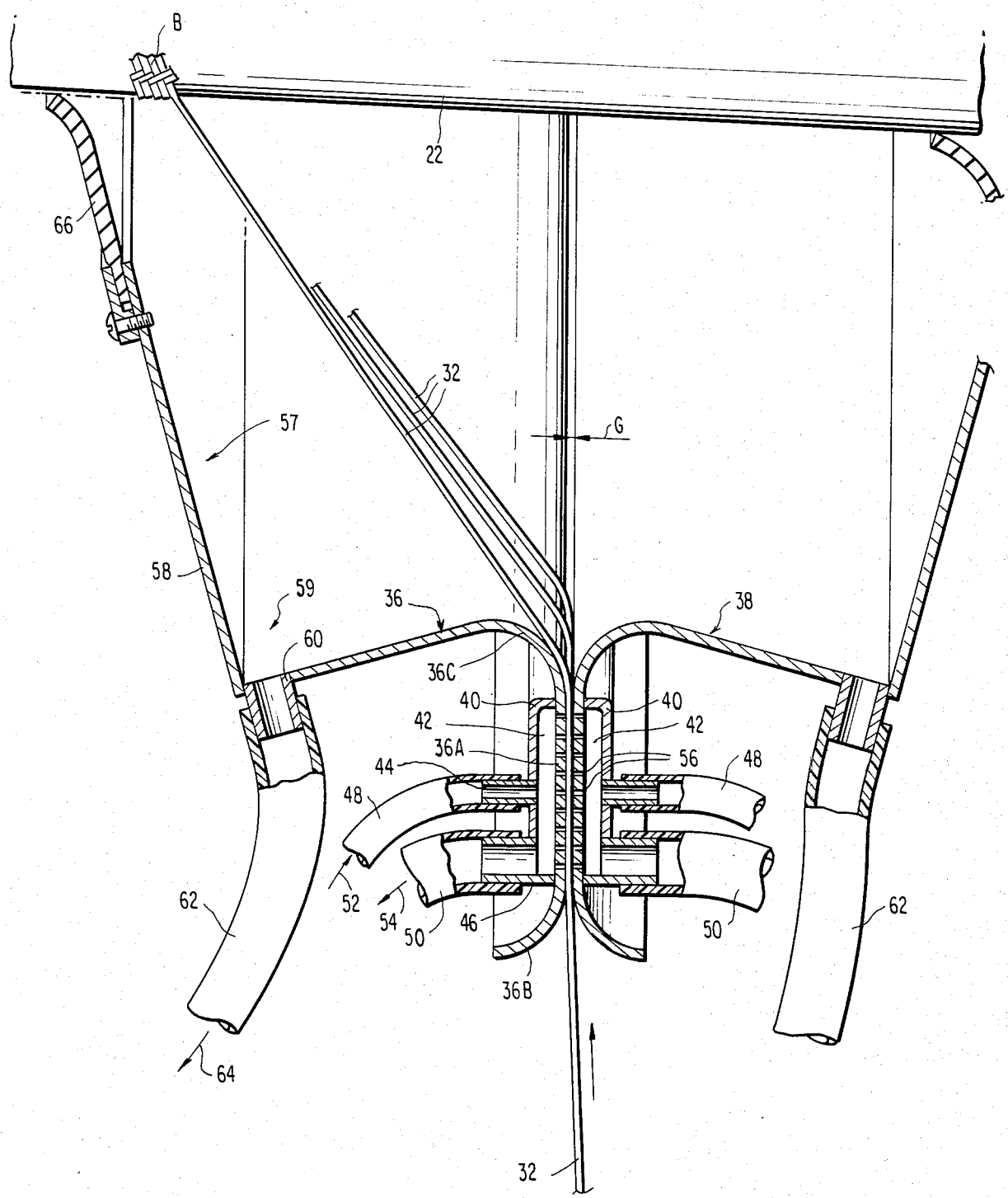
FIG. 2 is an enlarged vertical sectional view of a portion of the machine of FIG. 1 illustrating the resin impregnation components in detail.

Referring initially to FIGS. 1 and 2, a first embodiment of the present invention constitutes an improved braiding machine for braiding a plurality of filaments about a mandrel and for effecting resin impregnation of those filaments prior to braiding is indicated generally at 10. The machine 10 is shown in partial schematic form. The schematic representation includes a carriage 12 which is mounted by wheels 16 for rotation over a surface such as floor F, the wheels 16 being journaled to a base 14 of the carriage. A motor 15 coupled to wheel 16 functions to drive the carriage across the floor in the direction of arrow 17. Mounted to the carriage by way of vertical uprights 18 is a horizontal bar 20, the bar having affixed thereto, mandrel 22 which in this case is frustoconical in form and about which the filaments are braided to form a braid. Such arrangement is conventional, as is the utilization of a large diameter carrier or wheel 24 forming the basic elements of braiding machine 10. The carrier 24 supports a plurality of spools or bobbins 28 for rotation about their axes, from which individual filaments or fibers 32 are removed through eyes 30. Each filament 32 is trained about a guide ring of solid or hollow form 34 and the free end of each filament is fixed to the mandrel. The carrier 24 is mounted for rotation about its axis and coaxially of mandrel 22 by means of a suitable support mechanism including a plurality of rollers 35 which abut the inner periphery of carrier 24. The drive for the carrier 24 is shown schematically by a pressure roller 37 coupled to an electrical motor 39. Motor 39 is powered from a source (not shown) through leads 41. Motor 39 thus drives the carrier in rotation about its axis and coaxially of mandrel 22 in the direction of arrow 43.

The braiding mandrel 22 may be formed of a low density foam which is very effective in the braiding of FRP products for industrial use as for instance a windmill blade or the like, a fan blade or the like. The braiding B is essentially the product being formed, being a resin fiber glass reinforced braiding configured to the exterior configuration of mandrel 22 when the mandrel moves its axial length while braiding is achieved in the direction of arrow 17 through energization of drive motor 15 for carriage 12. The braid B is formed by crossing a number of fibers or filaments diagonally in such a way that each strand passes alternately over and under one or more of the others. In a regular braid, each strand passes alternately over and under two of the opposite strands and the braid shows two complete double ribs or lines or herring-bone shape. The braiding machine, with the exception of the resin impregnation features is highly developed. When warp threads are to be used, it is necessary to equip the machine with hollow warp studs and warp guides. One or more large diameter fixed guide rings such as guide rings 34 are conventionally used to direct the filaments towards the center of the braider where the moving mandrel 22 is fed along its axis at a controlled rate. The free end of the filaments 32 are tethered to the periphery of the mandrel at a given point and movement of the mandrel 22 longitudinally while carrier 24 is rotated about its axis effects the braiding. Braiding may be effected bidirectionally by movement of the mandrel 22 in opposite directions while rotating carrier 26 bearing the bobbins 28 about its axis.

As best seen in FIG. 2, in the first embodiment of the present invention, the filaments 32, as they approach the mandrel, are forced to pass over one or more applicator rings and specifically the porous filament contact surface thereof such that liquid resin may be applied to the filaments to achieve full resin impregnation of the filaments prior to contact with the mandrel 22 and braiding by and between the resin impregnated filaments 32. In FIG. 2 there are left and right side applicator rings, indicated generally at 36 and 38, respectively. In this arrangement, applicator ring 36 is shown as effecting resin application to the various filaments 32, however, if the machine 10 is run bidirectionally, the filaments, as they leave the exit end of the applicator ring gap, will alternately wrap about right side applicator ring 38 and be inclined oppositely to the direction shown in FIGS. 1 and 2. The rings 36 and 38 may be formed of sheet metal and bent to the configuration shown. Ring 36 includes a central vertical flat section or portion 36A which bears a plurality of small holes or pores 56 functioning to feed resin to the filaments 32 passing in contact therewith. Preceding section 36A is a short curved section 36B which acts as an inlet guide for the filaments while, downstream in the direction of filament movement, a further section 36C flares outwardly and has a circular configuration to guide the filaments 32 as they move away from the applicator ring 36 in the direction of the mandrel. Section 36C rises, then descends functioning with a right angle wall 58 as an extension thereof to define a drip pan, indicated generally at 59, for the collection of excess resin R. Further, plenum chamber wall 40 and ring 36 form a resin plenum chamber 42 within which resin R under a slight pressure above atmospheric is maintained to effect the desired resin impregnation of the fibers or filaments 32. Thus resin R is supplied under pressure to the plenum chamber 42 behind the ring applicator surface section 36A. Plenum chamber 42 distributes resin uniformly about the circumference of each of the rings 36 and 38. Application of resin to the plenum chambers 42 may be achieved sequentially, if bidirectional braiding occurs. Resin R is fed under pressure through a hose 48 to a short length tube 44 penetrating wall 40 and opening to the plenum chamber 42. Additionally, a second short length tube 46 opens to the same chamber at the bottom and a drain line or hose 50 is connected thereto for draining the interior of the chamber 42 when the braider is idle, thus returning the resin R to the resin tank 67, FIG. 1 through line 50 as shown. At the bottom of resin tank 67, the resin supply line 48 is connected thereto via pump 69 such that resin under slight pressure above atmospheric is maintained within plenum chamber 42. As may be seen, resin is continuously supplied to the chamber for pick up by the filaments as they wipe across the outer surface of applicator ring section 36A. In this embodiment, paired rings 36 and 38 define a small gap G which is slightly in excess to the diameter of the filaments or fibers 32 passing therebetween for resin application and impregnation. Applicator ring 38 is the mirror image of applicator ring 36 and like elements are given like numerical designations. Excess resin which drips off the fibers or filaments 32 is contained by the drip pan and wall 38 and accumulates at the corner or intersection of wall 58 and portion 36C of applicator ring 36 where it returns to the tank via line or hose 62. The line or hose 62 is connected via a short length tube 60 to the drip pan 59 and which tube opens to the interior of the drip pan. A soft flexible rubber, foam or brush scraper 66 is preferably mounted to wall 58 which contacts the periphery of the braid B in the vicinity of the area where the filaments contact the mandrel to form the braid. The scraper may constitute a resilient annular element whose center opening may be somewhat less in diameter than the diameter of the braid encompassing the mandrel so that the inner edge of the annular scraper is actually stretched to insure effective wiping of the exterior surface of the braid as it is formed by the resin impregnated filaments or fibers 32 to remove excess resin. Additionally, this member assists in thorough wetting of the filaments to maximize resin impregnation thereof.

Scraper 66, wall 58, and the drip pan 59 define a baffle assembly 57 for each applicator ring to each side of the filament path, to baffle the volatile components given off by the resin after resin application thereto and during braiding. By application of a suction device (not shown) to wall 58 for instance, such volatile components may be readily removed from the interior of the baffle without contaminating the atmosphere about the machine or the machine components exterior of these baffle assembly elements. Drain down valve 53 within line 50 leads back to the resin tank 67, which is normally closed, but it may be opened when braiding operation is terminated for any length of time so that the resin may be returned to the reservoir or resin tank 67. This prevents cured resin clogging the pores or finite holes 56. After the plenum chambers 42 have been drained, the pores 56 may be easily cleaned of resin by applying compressed air to the pores or forcing solvents to pass through the pores.

Figure 3:
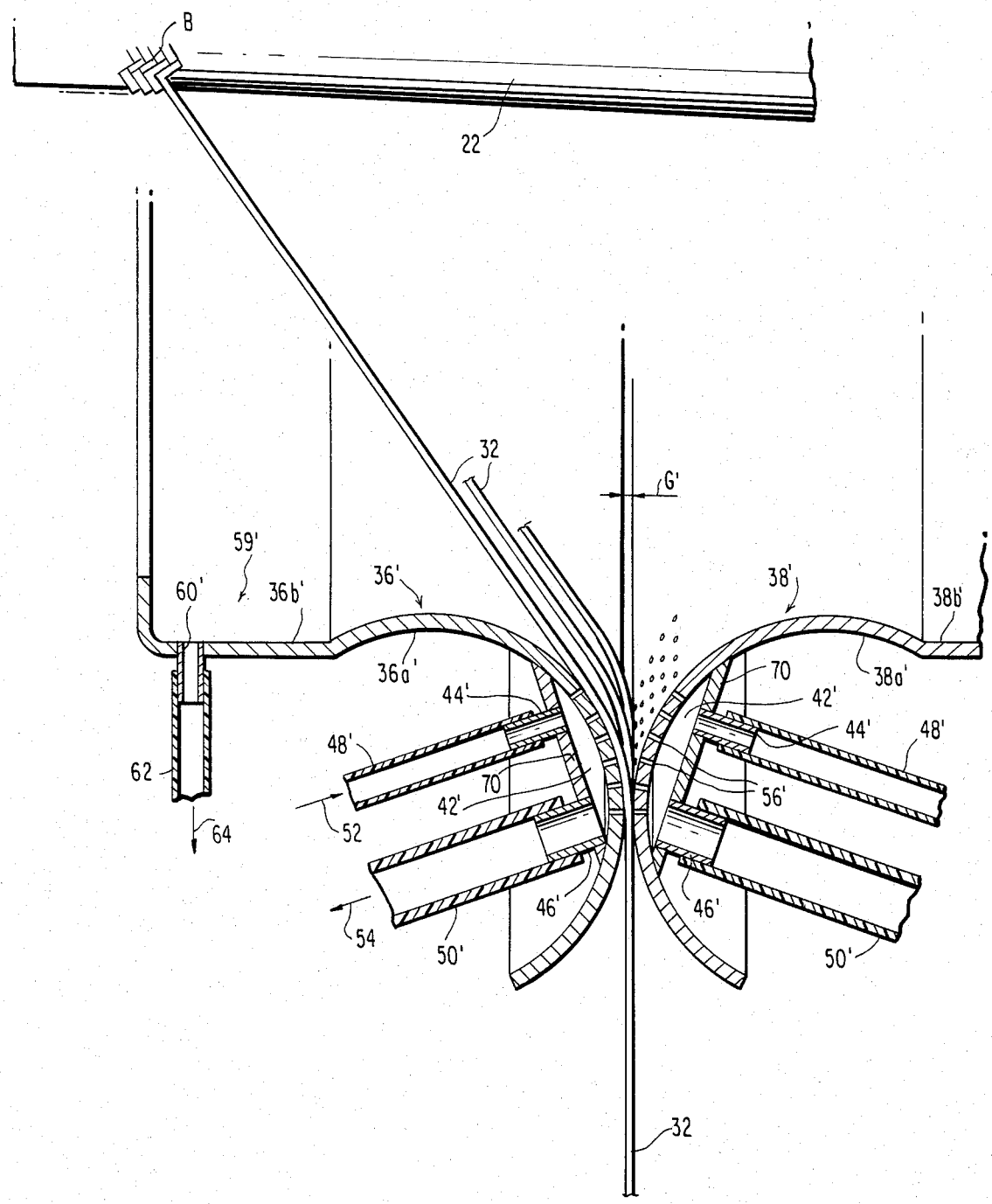
FIG. 3 is a vertical sectional view of a portion of a modified machine forming a second embodiment of the second invention.

Referring next to FIG. 3, in the second embodiment, like elements to those found in the drawings showing the first embodiment are similarly numbered, utilizing prime designations. In that respect, the fibers or filaments 32 move vertically upwardly as indicated by the arrow to the point where they pass between applicator rings 36' and 38', the rings in this case being formed with major portions 36a' and 38a' which are circular in cross section and which merge or continue into drip pan sections 36b' and 38b', respectively, to the left and right of the filament or fiber path. Again, the mandrel 22 having the braid B formed thereon, moves in the right to left direction as indicated by the arrow and the filaments or fibers 32 which are impregnated with resin partially wrap about the periphery of Section 36a' of the applicator ring 36'. It is to that surface area where resin is fed to the filaments 32 in a manner akin to the prior embodiment. In that respect, small diameter holes or pores 56' are provided within the circular cross section walls of both applicator rings 36' and 38' starting at a horizontal center plane for the circular portions or sections 36a' and 38a' of the respective applicator rings and extending upwardly thereof. An annular strip forming straight wall 70 sealably spans the rear of each of the rings 36, and 38', overlying the area of the perforations of the holes or pores 56' to form plenum chambers 42' with the portion of the rings bearing the holes or pores 56'. In similar fashion to the prior embodiment, a resin feed line or hose 48' supplies resin R under pressure as indicated by arrow 52 to the plenum chambers 42' selectively for applicator rings 36' and 38'. In this embodiment the plenum chamber 42' for applicator ring 36' is utilized and is supplied with resin for impregnating the filaments 32. A short length tube 44' borne by wall 70 and opening to the plenum chamber 42' is connected to the resin feed line 48'. A resin drain line or hose 50' permits the use of a solenoid operated valve (not shown) for draining of the contents of the plenum chamber when the braider stops. Line 50' connects to the plenum chamber through a short length tube 46' by sealably receiving a portion of that tube. In FIG. 3, only the drip pan 59' is shown, partially defined by horizontal wall 72. However, as in the other embodiment, a wall member 58' extends from the drip pan and terminates in a flexible rubber or foam scraper 66' which rides on the surface of the braid B after braiding to wipe excess resin from the braid and to further insure total impregnation of the filaments with resin. The drip pan 59' drains through the short length tube 60' to which drain line or hose 62' is connected as shown returning to the resin tank (not shown) as indicated schematically by arrow 64. Also, the circular cross section portions or sections 36a' and 38a' of the applicator ring are spaced from each other a distance identified by arrow G', thus forming a gap which may be slightly in excess of the diameter of the filaments or fibers 32 passing therethrough.

The operation is identical to that of the previously described embodiment. The utilization of two applicator rings permits the braiding to be achieved bidirectionally by alternately using applicator rings 36' and 38', in which case the mandrel is of necessity driven in the opposite direction from that shown, that is from left to right when applicator ring 38' is functioning to supply resin to the filaments for impregnation. As may be appreciated from the description of the first two embodiments of the present invention, there is achieved a versatile arrangement for continuously impregnating fibers during a braiding or weaving operation with the resulting production of high quality, low cost FRP composite parts. The applicator rings are easily adapted to a wide variety of resins and other liquids. Epoxies, polyesters, and vinyl esters of varying viscositites and densities may be employed and different reinforcing fibers 32 such as fiberglass, Kevlar, and graphite may be processed with equal results. One or two applicator rings and its attendant structure may be readily added to existing weaving or braiding equipment. Fiber impregnation is continuous during the braiding process. Where multiple layers are desired, the braid can be tied in place and then restarted with the mandrel feeding in the reverse direction as discussed previously. Bidirectional operation significantly increases production rates. Fiber impregnation is thorough and easily controlled. Voids in resin areas are avoided, and resin waste and workplace contamination is minimized. The use of the applicator ring and the attendant scrapers along with the drip pan structure permits baffling of the area of impregnation and permits removal of vapors generated in that area through the wall of the baffle mechanism by vacuum application to the interior of the baffle structure. The applicator rings may be easily set up, cleaned or modified for optimum performance for a particular choice of resin and reinforcing fiber. By use of the applicator ring impregnation mechanism, the machine can accommodate parts that are tapered or irregular in shape as easily as straight cylindrical parts (determined by the configuration of the mandrel).

As may be appreciated, impregnation using the applicator ring as the capillary feed mechanism to the fibers for impregnation is highlighted by several major components. One or two circular rings apply resin in a controlled fashion during braiding with the applicator rings having a specially formed porous surface which feeds resin continuously to the fibers before they are braided around the mandrel. The system is characterized by little waste, the ability to vary and maintain fluid pressurization of the resin within the plenum chambers by varying pump speed and without resin leaving the chambers by the small holes or pores in the absence of capillarity as a result of the resins wiping across the small beads of resin formed at the holes as a result of surface tension. By the utilization of integral or attached baffles, excess resin is prevented from dripping onto the braiding machinery and the surrounding workplace and the baffles are purposely formed so as to function in part as drip pans with the drip pans being equipped with drain lines and with the baffles by an attachment to a suction device functioning to contain vapors generated during impregnation which can be removed as they are generated. By the use of a resin reservoir or tank, the resin may be pumped under low pressure to the plenum chambers of the applicator rings and the flow may be controlled by conventional means such as regulators and solenoid valves.

From the prior description, it may be appreciated that the plenum chambers distribute resin uniformly around the circumference of the ring when the applicator ring or rings are oriented vertically. With the mandrel fed horizontally, as in the illustrated embodiments, it may be preferred to segment the plenum chambers by using radial divider walls to reduce the hydraulic head due to gravity. As such, it requires multiple resin feed lines to the segments and overcomes gravity influence in causing dripping by increasing the pressure on the captured resin within the plenum chambers to the point where the surface tension of the resin within the small holes or pores is broken. By using a resin pump 69 whose output may be varied, while the braider is stopped, the resin in the plenum chambers may be maintained at atmospheric pressure so that no resin flow occurs. When the braider is operating, the pressure within the plenum chamber may be increased as necessary to achieve the desired resin content. At low pressure the resin will bulge out of the pore opening but will not flow until the filament passes over the pore. At this moment the filament 32 which is treated to be easily wetted by the resin, breaks the surface tension it draws in resin by capillary action. The resin pressure may be further increased by varying pump speed, causing resin to flow continuously from the pores when a greater resin content is required. Additional modifications to the applicator rings may be made to suit the needs of a particular resin system. For example, dimensions of the plenum chambers may be kept very small to minimize heat buildup in an exothermic resin, or heating or cooling jackets may be added as needed.

Under certain circumstances, the reinforcing filaments 32 or the resin material may have unique properties which are incompatible with the applicator rings forming the principal components of the embodiments previously described. Examples of potential problems include the use of very brittle fibers which could be damaged or snagged when passing over the small holes in the applicator rings or where resins have very low surface tension.

Figure 4:
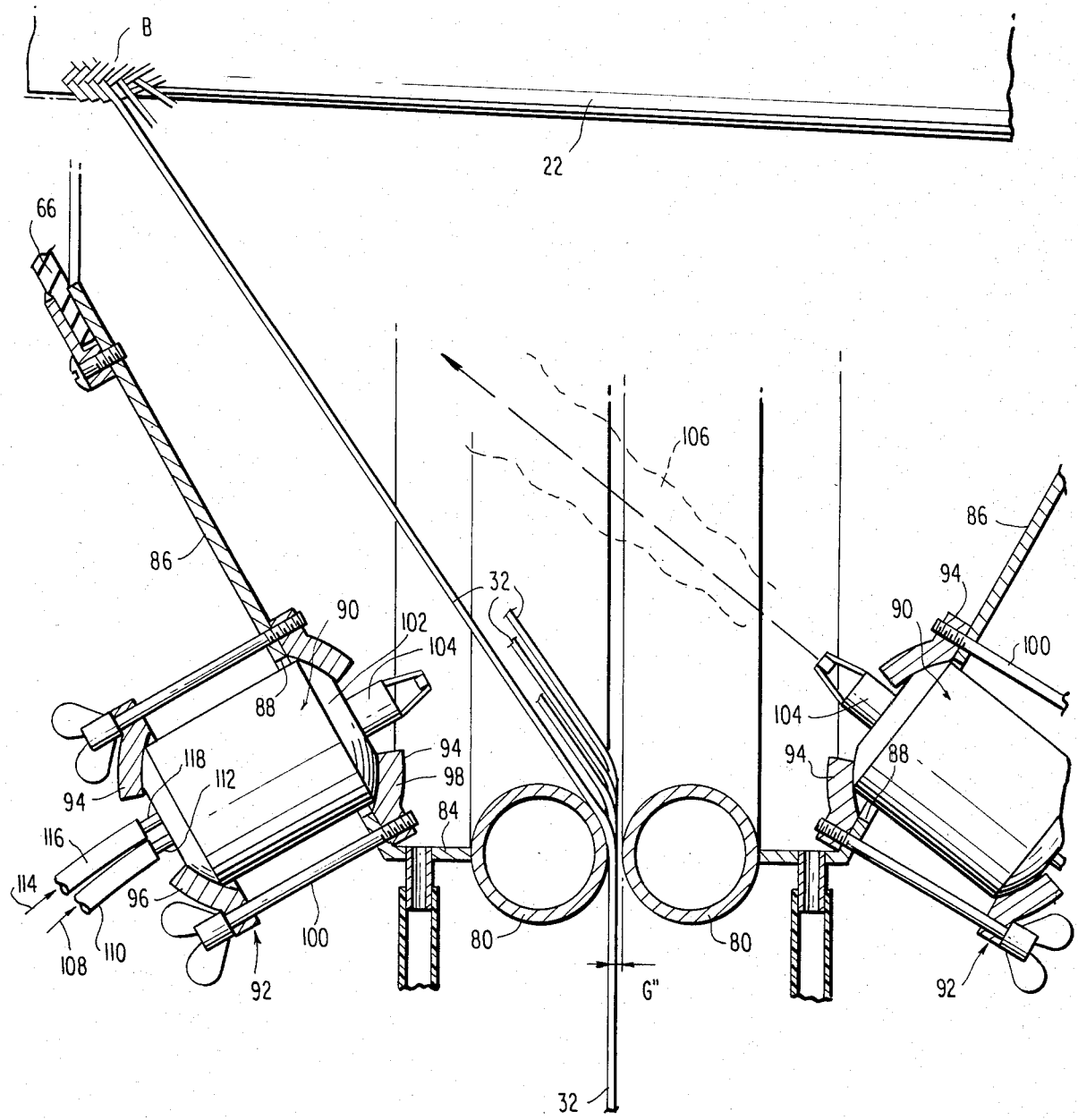
FIG. 4 is a vertical sectional view of a portion of a machine further modified from that of FIGS. 1 and 2 and forming yet a third embodiment of the present invention.

In such cases it may be necessary to use the embodiment of the invention as illustrated in FIG. 4. Again in that embodiment the elements of the braiding machine which are like those of the prior embodiments are given like numerical designations. The portion of the machine of this embodiment subject to change comprises the components for applying the resin to filaments 32 prior to the filaments being braided about a foam core mandrel, pressure bag, or the like. Mandrel 22 is identical to that of the prior embodiments. The system utilizes the resin tank, resin pump, and resin circulation components of the prior embodiments. The changes involve principally, the replacement of the applicator rings with nonapplicator guide rings 80 and 82 which are of circular cross section and in this case hollow although they could be solid. The guide rings are separated by a distance or gap g", which gap is somewhat larger than the gaps between the applicator rings since, where the applicator rings function to apply the resin of the prior embodiments to the filament dual applicator rings may be employed simultaneously to wet opposite sides of the filaments which pass through the gaps. The guide rings 80 and 82 are provided with smooth outer surfaces which function only to guide the filaments in their travel from the bobbins on the braiding machine carrier 26 to mandrel 22. The guide rings 80 and 82 are supported by cylindrical members 84 on their outside surfaces remote from the filament path defined by rings and gap g". Inclined frustoconical baffle walls 86 extend therefrom or are integral therewith, the frustoconical walls 86 terminating in flexible rubber or foam scrapers 66 of annular form similar to those of the prior embodiments. Holes 88 are formed within the frustoconical baffle walls 86 at various circumferential locations, within which are mounted spray nozzle units indicated generally at 90 by way of a nozzle mounting structures 92 consisting of multiple clamps 94. The clamps 94 involve spaced arcuate clamping fingers 96 and 98 through which pass the shaft portion of an adjusting thumb screw 100. Rotating the thumb screw increases or decreases the pressure exerted by the fingers 96 and 98 on the nozzle manifold block 102 of the nozzle 90. Projecting outwardly from one end of the nozzle manifold block 102 is a atomizer or spray nozzle 104. These nozzle units are commercially available such as the Flow Sonic Twin Fluid atomizers manufactured by Fluid Kinetics Incorporated of Fairfield, Ohio. The nozzle units 90 are characterized by their production of a wet "fog" of very fine resin droplets which function to quickly wet out the fibers 32 without impinging on the fibers at high velocity and thus eliminate the possibility of fracture of the filaments or fibers 32 prior to braiding. Their spray nozzles 104 produce a spray pattern of resin droplets as indicated at a generally at 106. The resin is fed, as indicated by arrow 108, through a resin feed line or hose 110 to the nozzle manifold block 102, the hose is being coupled thereto by a tube or a fitting 112. If necessary, air under pressure may be fed as indicated by arrow 114 through an air feed line or hose 160 to the block and thence to the atomizer or spray nozzle 104, through a coupling or tube 118. By the utilization of such wet "fog" in the form of very fine resin droplets, the resin lightly contacts the filaments. Such contact is partially insured by utilization of the array of spray nozzle units 90 to the side of the ring opposite that about which the filaments are partially wrapped, this gives the advantage that the spray of resin droplets meet the filaments remote from the initiation of the spray while additionally, the spray flow pattern direction is the same as the movement of the filaments. Conventional nozzles normally produce a high velocity stream of droplets which could damage the fibers or result in excessive resin losses from splashing. By utilizing the baffle arrangement with drain and/or suction lines, workplace contamination by both generated vapors and waste resin is minimized.

Exemplary of the practical use of the modified braiding machine of the present invention is the production of complex geometry parts, i.e. fiberglass rotor blades for modern wind turbines. A standard commercially available 144 carrier braider, such as Mossberg Number 2, was modified to form the embodiment of FIGS. 1 and 2, set up for horizontal operation and the motor driven carriage 12 was used to feed mandrel 22 through the center of the braiding machine 10. The mandrel comprised a low density urethane foam core molded to the inside dimensions of the wind turbine blade which was purposely mounted to the carriage 12 as an expendable mandrel. A metal root end retention bushing (not shown) provided with a number of small pins extending from it was bonded to one end of the foam core mandrel, thus the retention fitting was built into the braided structure in a single operation with no finishing operations required. Since a wind turbine blade is subjected to high bending loads the braiding machine was required to produce a triaxial braid with a large percentage of unidirectional fibers. By the utilization of the Mossberg Number 2 braider, up to 72 warp (longitudinal) filaments or fibers 32 were fed through the centers of the horn gears (not shown) on the 144 carrier braider to provide great bending strength and stiffness to the molded product. The over and under bias braided filaments 32 provided torsional stiffness and improved through-thickness strength compared to conventional fiber orientations. The use of warp filaments is important in optimizing the use of braiding for wind turbine blades by increasing the bending strength and allowing greater ability for aerial elastic tailoring. The braiding operation was found to be extremely fast in comparison to prior techniques operating at a standard speed of 32 picks per minute in a blade with a construction of 4.5 picks per inch was found to feed through the braider at nearly 6 feet per minute. It was determined, utilizing the first two embodiments of the present invention, that a resin with a surface tension the same as water (0.005 lbs/ft) a pressure of 0.2 psig is required to initiate flow through a pore 56 or fixed 56' having a diameter of 0.005 inches. A fluid with a surface tension one-half as great would require one-half the pressure. Such braiding machines modified by the resin application components of the embodiments herein provide a low cost alternative to conventional FRP manufacturing processes. They provide a unique versatility permitting the production of unusual geometry parts using inexpensive tooling and thus open up new applications for composite material manufactured.

While the invention has been described in detail and with reference to specific embodiments thereof, it will be apparent to one skilled in the art that various changes and modifications can be made therein without departing from the spirit and scope thereof.

I claim:

1. In a braiding machine for braiding a plurality of filaments about a mandrel, said machine including:
    a base,
    a mandrel supported on said base for movement along its axis,
    a braid wrapping carrier mounted for rotation about its axis and concentrically about the mandrel at a fixed longitudinal rotational plane position relative to the mandrel movement,
    means for mounting bobbins of filaments to be braided to said carrier at spaced circumferential positions thereon for bobbin rotation about their axes,
    means for fixing free ends of the filaments to said mandrel at a point axially spaced from said carrier rotation plane,
    means for rotating said carrier and axially shifting said mandrel to cause said filaments to wrap about said mandrel and to form a braid, the improvement comprising:
    a means defining at least one annular applicator ring fixedly mounted concentrically about said mandrel axially and radially between said carrier rotation plane and the filament contact area with said mandrel and being sized and in a position such that the filaments partially wrap and wipe across a filament wrapping surface of said applicator ring,
    means internally of said applicator ring and including the filament wrapping surface portion of said applicator ring for defining a closed plenum chamber,
    finite pores within said filament wrapping surface of said ring,
    means for supplying a coating liquid under pressure to said plenum chamber and wherein,
    said pores are sized such that, depending on the viscosity of the coating liquid and the fluid pressure within said chamber, the coating liquid bulges out of the pore opening but is prevented from flowing therefrom until a filament passes over the pore, whereby the filament breaks the surface tension and draws in the liquid by capillary action to impregnate the filament with said coating liquid.

2. The braiding machine as claimed in claim 1, further comprising a baffle structure extending from said applicator ring to said bobbin and terminating in a flexible scraper which is pressed against the periphery of the braid downstream of the area of initial filament contact with the mandrel and braiding to facilitate impregnation of the coating liquid and wiping of excess coating liquid off of the finished braid and for confining any vapors formed by coating liquid application to the filaments to the area between the applicator ring and the mandrel.

3. The braiding machine as claimed in claim 1 wherein, said at least one annular applicator ring comprises two applicator rings mounted side by side with a gap therebetween equal to or slightly larger than the thickness of the filaments and defining opposing filament wiping surfaces and wherein,
    said finite pores are formed within opposed filament wiping surface areas of said applicator rings and wherein,
    each applicator ring includes a separate plenum chamber such that the plenum chambers may be jointly or successively supplied with coating liquid to jointly effect impregnation of the liquid within the filaments or alternatively effecting impregnation depending upon the direction of mandrel movement relative to the applicator rings.

4. The braiding machine as claimed in claim 3, wherein said applicator rings each comprise a straight filament wiping surface which is generally at right angles to the axis of the mandrel which surface bears said finite pores and wherein, the gap between the filament wiping surfaces of the latterally spaced, opposed applicator rings is generally equal to the diameter of the filaments passing therethrough such that both applicator rings function to coat the filaments with the coating liquid by capillary action as opposite sides of the filaments wipe across the pores of respective applicator ring filament wiping surfaces when coating liquid under pressure is supplied to both plenum chambers.

5. The braiding machine as claimed in claim 3, wherein the mandrel is horizontal, the carrier is mounted for rotation about a horizontal axis and wherein, said annular applicator rings are vertically oriented with their axes coaxial with the mandrel, the filament wiping surfaces bearing the finite pores are vertical and said rings flare outwardly and away from each other downstream of the filament wiping surface area bearing said pores in terms of the direction of movement of the filaments, include portions which extend diagonally, outwardly and downwardly and terminate in baffle walls which extend upwardly in the direction of the mandrel, said baffle walls each further terminating in a flexible scraper having an edge in contact with the periphery of the formed braid and functioning to wipe off excess coating liquid, facilitate impregnation of the filaments with the coating liquid and wherein, the scrapers, the baffle walls, and the applicator rings define an enclosed area for coating liquid contact with the filaments to collect waste liquid and to prevent the balance of the braiding machine from being contaminated by such waste coating liquid or any vapors generated thereby.

6. The braiding machine as claimed in claim 1, wherein said at least one annular applicator ring includes a portion defining said filament wiping surface which is circular in radial cross section which filament wiping surface includes said finite pores and wherein, said pores extend from a horizontal center plane passing through the axis of the circular portion at the point of initial contact of the filaments with the applicator ring in a direction towards said mandrel and extend the complete wrap angle of the filaments about the periphery of said circular portion of the applicator ring.

7. The braiding machine as claimed in claim 6, wherein said plenum chamber is defined by straight wall strip of annular form sealably spanning across the inside of the circular radial cross-section portion of said annular applicator ring and overlying the pores penetrating the filament wiping surface portion of said annular applicator ring.

8. In a braiding machine for braiding a plurality of filaments about a mandrel, said machine including:
a base,
a mandrel supported on said base for movement along its axis,
a braid wrapping carrier mounted for rotation about its axis and concentrically about the mandrel at a fixed longitudinal rotational plane position relative to the mandrel movement,
means for mounting bobbins of filaments to be braided to said carrier at spaced circumferential positions thereon for bobbin rotation about their axes,
means for fixing the free ends of the filaments to said mandrel at a point axially spaced from said carrier rotation plane,
means for rotating said carrier and axially shifting said mandrel to cause said filaments to wrap about said mandrel and to form a braid,
the improvement comprising:
at least one annular guide ring fixedly mounted concentrically about said mandrel, axially spaced between the carrier rotation plane and the filament contact area with said mandrel such that the filaments wipe across the surface of said guide ring,
wall means in juxtaposition to said guide ring and extending generally parallel to the direction of inclination of the filaments wrapped about the filament wrapping surface portion of the guide ring and extending towards said mandrel and terminating in a flexible scraper which is pressed against the periphery of the braid downstream of the area of initial filament contact with said mandrel, and
spray nozzle means for spraying a fog of minute resin droplets onto said filaments during passage from said guide ring to said mandrel for resin impregnation of said filaments with said scraper wiping any excess coating of resin off the finished braid and said wall means confining any vapors formed by said resin application to the filaments to the area between the guide ring and the mandrel.

9. The braiding machine as claimed in claim 8, wherein said at least one guide ring comprises two rings mounted side by side with a gap therebetween generally equal to the thickness of the filaments which pass therethrough, with said rings defining opposing filament wiping surfaces, each of said guide rings having baffle walls extending therefrom in the direction of the mandrel to the outside of the filament path, and forming said wall means and each of said baffle walls carrying a flexible scraper pressed against the periphery of the braid downstream of the area of initial filament contact with the mandrel and braiding, and wherein said spray nozzle means comprises a plurality of spray nozzles mounted within respective baffle walls and oriented so as to spray a resin fog generally in a direction nearly parallel with the direction of filament movement from said guide rings to said mandrel, and wherein the spray nozzles in juxtaposition to a given guide ring function to provide a resin fog pattern for filaments wrapped about the guide ring remote from that array of spray nozzles.

* * * * *